United States Patent [19]
Chia-Ying et al.

[11] Patent Number: 5,717,431
[45] Date of Patent: Feb. 10, 1998

[54] ERGONOMIC KEYBOARD FOR A PORTABLE COMPUTER AND METHODS OF OPERATION AND MANUFACTURE THEREFOR

[75] Inventors: Chen Chia-Ying, Taipei, Taiwan; Andrew W. Moore, Austin, Tex.; Andrew G. Ziegler, Arlington, Mass.

[73] Assignee: Dell USA, L.P., Austin, Tex.

[21] Appl. No.: 745,633

[22] Filed: Nov. 8, 1996

Related U.S. Application Data

[63] Continuation-in-part of Ser. No. 583,267, Jan. 5, 1996.

[51] Int. Cl.$^6$ .................................................. G09G 5/00
[52] U.S. Cl. ............................ 345/168; 400/82; 400/489
[58] Field of Search ...................................... 345/168, 169, 345/901, 905; 400/82, 486, 489

[56] References Cited

U.S. PATENT DOCUMENTS

| | | | |
|---|---|---|---|
| D. 287,854 | 1/1987 | Crews | D14/100 |
| D. 314,205 | 1/1991 | Lang et al. | D18/1 |
| D. 339,330 | 9/1993 | Sapper et al. | D14/106 |
| 3,693,184 | 9/1972 | Maling | 346/74 M |
| 3,805,939 | 4/1974 | Ross | 197/19 |
| 3,929,216 | 12/1975 | Einbinder | 197/100 |
| 3,945,482 | 3/1976 | Einbinder | 197/100 |
| 3,980,869 | 9/1976 | Lombardino et al. | 235/146 |
| 4,081,068 | 3/1978 | Zapp | 197/98 |
| 4,201,489 | 5/1980 | Zapp | 400/485 |
| 4,244,659 | 1/1981 | Malt | 400/486 |
| 4,253,774 | 3/1981 | Hanakata et al. | 400/87 |
| 4,265,557 | 5/1981 | Runge | 400/479 |
| 4,294,555 | 10/1981 | Galaske et al. | 400/488 |
| 4,332,493 | 6/1982 | Einbinder | 400/484 |
| 4,414,537 | 11/1983 | Grimes | 340/365 R |
| 4,449,839 | 5/1984 | Bleuer | 400/485 |
| 4,467,321 | 8/1984 | Volnak | 340/365 VL |
| 4,483,634 | 11/1984 | Frey et al. | 400/489 |

(List continued on next page.)

FOREIGN PATENT DOCUMENTS 0 674 331 A1   2/1995   European Pat. Off. ....... H01H 13/70

OTHER PUBLICATIONS

Publication entitled "The Select-Ease Keyboard, an Innovative Design for Personal Flexibility" 1994 Lexmark International, Inc.

Publication by Macworld, the Macintosh® Magazine; Feb. 1990; entitled "Honey, I Split the Keyboard".

Publication by Macuser; Jun. 1995; vol. 11, No. 6, p. 57 entitled "Comfort Keyboard System/Split to Fit Your Hands".

*Primary Examiner*—Mark R. Powell
*Assistant Examiner*—Matthew Luu
*Attorney, Agent, or Firm*—Hitt Chwang & Gaines, P.C.

[57] ABSTRACT

A portable computer and method of operation thereof. The portable computer includes: (1) a first chassis portion hingedly coupled to a second chassis portion by first and second bulkheads to allow relative rotation between a closed position and an open position, (2) a display screen associated with the first chassis portion, (3) data processing and storage circuitry contained within the second chassis portion and coupled to the display screen via a cable located proximate a hinge structure coupling the first and second chassis portions and (4) a keyboard coupled to the second chassis portion and the data processing and storage circuitry and including: (4a) a first keyboard portion pivotally coupled to a first location on the second chassis portion for rotation relative thereto, the first keyboard portion supporting a first plurality of keys aligned along a first axis, (4b) a second keyboard portion pivotally coupled to a second location on the chassis for rotation relative thereto, the second keyboard portion supporting a second plurality of keys aligned along a second axis, and (4c) a baseplate having a plurality of peripheral tabs aligning with corresponding slots formed in the second chassis portion, the first and second keyboard portions coupled to the baseplate.

20 Claims, 13 Drawing Sheets

U.S. PATENT DOCUMENTS

| | | | |
|---|---|---|---|
| 4,492,158 | 1/1985 | Clark | 101/71 |
| 4,509,873 | 4/1985 | Ryan | 400/489 |
| 4,522,518 | 6/1985 | Schmidt | 400/486 |
| 4,543,563 | 9/1985 | Wine | 340/365 S |
| 4,555,193 | 11/1985 | Stone | 400/486 |
| 4,579,470 | 4/1986 | Casey | 400/489 |
| 4,597,681 | 7/1986 | Hodges | 400/488 |
| 4,613,247 | 9/1986 | McGunnigle | 400/486 |
| 4,615,629 | 10/1986 | Power | 400/486 |
| 4,655,621 | 4/1987 | Holden | 400/100 |
| 4,661,005 | 4/1987 | Lahr | 400/489 |
| 4,669,903 | 6/1987 | Herzog et al. | 400/489 |
| 4,735,520 | 4/1988 | Suzuki et al. | 400/488 |
| 4,737,040 | 4/1988 | Moon | 400/110 |
| 4,761,522 | 8/1988 | Allen | 200/5 R |
| 4,775,255 | 10/1988 | Langley | 400/485 |
| 4,778,295 | 10/1988 | Bleuer | 400/485 |
| 4,824,268 | 4/1989 | Diernisse | 400/486 |
| 4,833,446 | 5/1989 | Eilam et al. | 341/22 |
| 4,836,700 | 6/1989 | Jensen | 400/489 |
| 4,849,732 | 7/1989 | Dolenc | 341/20 |
| 4,913,573 | 4/1990 | Retter | 400/489 |
| 4,917,516 | 4/1990 | Retter | 400/489 |
| 4,927,279 | 5/1990 | Morgan | 400/486 |
| 4,971,465 | 11/1990 | Hashimoto | 400/485 |
| 4,974,183 | 11/1990 | Miller | 364/709 |
| 5,003,301 | 3/1991 | Romberg | 340/711 |
| 5,006,001 | 4/1991 | Vulcano | 400/486 |
| 5,017,030 | 5/1991 | Crews | 400/485 |
| 5,021,922 | 6/1991 | Davis et al. | 361/380 |
| 5,029,260 | 7/1991 | Rollason | 235/145 |
| 5,044,798 | 9/1991 | Roylance et al. | 400/472 |
| 5,059,048 | 10/1991 | Sirkin | 400/486 |
| 5,067,834 | 11/1991 | Szmanda et al. | 400/489 |
| 5,073,050 | 12/1991 | Andrews | 400/82 |
| 5,087,910 | 2/1992 | Guyot-Sionnest | 340/711 |
| 5,122,786 | 6/1992 | Rader | 340/711 |
| 5,129,747 | 7/1992 | Hutchison | 400/489 |
| 5,137,384 | 8/1992 | Spencer et al. | 400/489 |
| 5,141,343 | 8/1992 | Roylance et al. | 400/472 |
| 5,156,475 | 10/1992 | Zilberman | 400/472 |
| 5,160,919 | 11/1992 | Mohler et al. | 340/711 |
| 5,166,669 | 11/1992 | Ronberg | 340/711 |
| 5,170,348 | 12/1992 | Hirose | 364/419 |
| 5,178,477 | 1/1993 | Gambaro | 400/489 |
| 5,197,811 | 3/1993 | Levinrad | 400/489 |
| 5,198,991 | 3/1993 | Pollitt | 364/708 |
| 5,212,638 | 5/1993 | Bernath | 364/419 |
| 5,228,791 | 7/1993 | Fort | 400/489 |
| 5,267,127 | 11/1993 | Pollitt | 361/680 |
| 5,270,709 | 12/1993 | Niklsbacher | 341/20 |
| 5,281,966 | 1/1994 | Walsh | 341/22 |
| 5,287,245 | 2/1994 | Lucente et al. | 361/680 |
| 5,297,003 | 3/1994 | Nomura et al. | 361/680 |
| 5,302,040 | 4/1994 | Louis | 400/489 |
| 5,318,367 | 6/1994 | Braun et al. | 400/82 |
| 5,332,322 | 7/1994 | Gambaro | 400/489 |
| 5,336,001 | 8/1994 | Lictenberg | 400/489 |
| 5,336,002 | 8/1994 | Russo | 400/489 |
| 5,339,097 | 8/1994 | Grant | 345/168 |
| 5,342,005 | 8/1994 | Szmanda et al. | 248/118 |
| 5,351,066 | 9/1994 | Rucker et al. | 345/168 |
| 5,360,280 | 11/1994 | Camacho et al. | 400/489 |
| 5,361,082 | 11/1994 | Chung | 345/168 |
| 5,367,298 | 11/1994 | Axthelm | 400/486 |
| 5,372,441 | 12/1994 | Louis | 400/489 |
| 5,426,449 | 6/1995 | Danziger | 345/168 |
| 5,457,452 | 10/1995 | Skovronski | 341/22 |
| 5,502,460 | 3/1996 | Bowen | 345/168 |
| 5,519,569 | 5/1996 | Sellers | 361/680 |
| 5,539,615 | 7/1996 | Sellers | 361/680 |
| 5,612,691 | 3/1997 | Murmann et al. | 345/168 |
| 5,613,786 | 3/1997 | Howell et al. | 400/489 |

ERGONOMIC KEYBOARD FOR A PORTABLE COMPUTER AND METHODS OF OPERATION AND MANUFACTURE THEREFOR

CROSS REFERENCE TO RELATED APPLICATION

This is a continuation-in-part of Ser. No. 08/583,267, filed Jan. 5, 1996 pending, entitled "Ergonomic Keyboard for a Portable Computer and Methods of Operation and Manufacture Therefor," commonly assigned with the present invention and incorporated herein by reference.

TECHNICAL FIELD OF THE INVENTION

The present invention is directed, in general, to keyboards for computers and the like and, more specifically, to a keyboard for a portable computer that is divided into multiple portions movable with respect to one another to allow the keyboard to assume an expanded state wherein the keyboard is positioned for use to ergonomic advantage.

BACKGROUND OF THE INVENTION

In recent years personal computers ("PCs"), in general, and portable computers, in particular, have made considerable gains in both popularity and technical sophistication. Portable, battery-powered computers have become increasingly popular over the last several years due to their light weight and small size that permit them to be easily hand-carried in an ordinary briefcase and used by business travelers in cramped spaces, such as on airline seat back trays, lacking electrical plug-in facilities. One factor contributing to the increasing popularity of the notebook computer is its ever-decreasing size and weight, a factor arising from the ability to fabricate various components of the computer in smaller and smaller sizes while, in many cases, increasing the operating speed and decreasing the power utilization requirements of such components. In fact, a particularly small type of portable computer, the notebook computer, is very popular, generally having dimensions of 8.5"×11" and a weight of less than 8 pounds. For purposes of this discussion, "portable" and "notebook" are synonymous terms. The modern portable computer typically incorporates both hard and floppy disk drives, a monitor screen built into its lid portion, and a keyboard built into its main body portion. It is thus a fully self-contained computer able to be used in situations and locations in which the use of a much larger desktop computer is simply not feasible. While portable computers were at one time often employed as an adjunct to a primary desktop computer, the increased power of such computers has allowed them to become many users' primary computers.

One continuing challenge in the design of notebook computers, however, is the keyboard structure. This design challenge has, to this point, arisen from two conflicting design goals—the desire even further to reduce the size of the keyboard structure, and the desirability of having the notebook computer emulate as closely as possible the size and typing "feel" of a desktop computer keyboard. The size of the typical human hand is the driving force behind the latter of the two requirements, substantially limiting the amount of miniaturization that can be wrought.

Designers have begun to realize, however, that there is yet a third design goal, brought about as a result of medical studies regarding the degree of stress inflicted on a user's arms, wrists and hands during the act of typing and economically reinforced by costly litigation instigated by computer users who have found themselves the victim of carpal tunnel syndrome or related muscular or joint maladies. "Human factors engineering" or "ergonomics" have become terms of art for design engineering directed to optimum usability by the human body. In the case of keyboards, it has been recognized that, by splitting a keyboard into portions and changing the relative horizontal orientation of the portions, a keyboard may be rendered less strenuous to use, potentially decreasing the likelihood of injury and increasing user productivity by significantly increasing typing comfort.

However, the ergonomic keyboards developed to date have been exclusively for desktop computers, because there are no practical spatial limitations on a desktop to hinder the keyboard's size. It is similarly desirable to provide an ergonomic keyboard for portable computers. However, portable computers continue to decrease in size, certainly complicating the design of an ergonomic keyboard. Therefore, keyboard designers have only now begun to turn their attention to creating ergonomic keyboards for such computers that accommodate the spatial restrictions.

There are, of course, two dimensional factors that may be varied to reduce the size of a notebook computer keyboard structure—its vertical or thickness dimension and its horizontal dimensions (i.e., its length and width). Several restraints are presented when attempts are made to reduce the overall thickness of a notebook computer keyboard. One possibility that has been investigated and attempted is to simply reduce the keystroke distance in the notebook computer keyboard compared to its desktop counterpart. An example of this type of keyboard is a "membrane" keyboard often found on microwave ovens or cash registers. Using this design technique, the overall thickness of the notebook computer in its closed storage and transport position may be correspondingly reduced. However, this thickness reduction in the overall notebook computer, achieved by reducing the keyboard keystroke distance, creates what many users consider to be a degradation in typing "feel" compared to the longer keystroke distance typically found in a larger desktop computer keyboard.

It is more desirable, however, to effect a size reduction in the horizontal direction, as so-called "subnotebook" computers are larger by far in their horizontal dimensions and therefore would benefit most from a reduction therein. Unfortunately, similar restrictions have also been experienced when attempting to reduce the horizontal dimensions of a keyboard. The number, size, and relative spacing of the manually-depressible key cap portions of a keyboard govern the keyboard's horizontal dimensions. Various reductions in these three dimensional factors may be used to reduce the overall length or width of the keyboard. However, prior art attempts to reduce these three factors to gain a keyboard size reduction have correspondingly lessened the similarity of the notebook computer keyboard in appearance, key arrangement and typing feel to its desktop counterpart. Keyboards having a smaller key size or spacing are therefore often derisively referred to as "chiclet" keyboards.

As can be readily seen from the foregoing, what is needed in the art is an ergonomic portable computer keyboard structure that is collapsible, thereby allowing the keyboard to assume a stowed position wherein the keyboard resides within a footprint of even reduced-size subnotebook computers and the like. When deployed, the ergonomic keyboard should be comfortable to use and reliable in operation.

SUMMARY OF THE INVENTION

To address the above-discussed deficiencies of the prior art, it is a primary object of the present invention to provide an ergonomic keyboard movable between a deployed position wherein portions of the keyboard are rotated relative to one another to effect an ergonomic presentation of keys to a user and a stowed position wherein the keyboard collapses to assume a footprint smaller than that of the deployed position.

In the attainment of the above primary object, the present invention provides an ergonomic keyboard for a portable computer having a chassis and methods of operation and manufacture therefor. The keyboard includes: (1) a first keyboard portion pivotally coupled to a first location on the chassis for rotation relative thereto, the first keyboard portion supporting a first plurality of keys aligned along a first axis, (2) a second keyboard portion pivotally coupled to a second location on the chassis for rotation relative thereto, the second keyboard portion supporting a second plurality of keys aligned along a second axis and (3) a linkage coupling the first and second keyboard portions for rotating the second keyboard portion as a function of a rotation of the first keyboard portion, the keyboard thereby movable between a deployed position wherein the first and second axes are misaligned to effect an ergonomic presentation of the first and second pluralities of keys to a user and a stowed position wherein the first and second keyboard portions are within a footprint of the chassis.

The present invention therefore introduces an ergonomic keyboard that rotates during deployment to present misaligned keys (keys having axes angled with respect to one another) to reduce strain on the user's wrists and hands during use. In the stowed position, the keyboard collapses to within the footprint of the computer, thereby maintaining the size of the footprint.

In a preferred embodiment of the present invention, the chassis comprises a baseplate, the first and second keyboard portions coupled to the baseplate, the baseplate forming a support for the first and second keyboard portions. In a manner to be illustrated, the baseplate provides a foundation and support for the first and second keyboard portions and, in one embodiment, a pointing device portion of the keyboard. In the alternative, separate structures within the chassis may support the first and second keyboard portions, thereby eliminating a need for the baseplate.

In a preferred embodiment of the present invention, the keyboard further comprises a pointing device portion coupled to the chassis. The pointing device portion may include one or more of a trackball, a trackpad or momentary clicking buttons, as the particular application requires. In alternative embodiments to be illustrated, the pointing device portion may be fixed or translatable relative to the chassis. Of course, the scope of the present invention is sufficiently broad to encompass embodiments not including a pointing device portion.

In one embodiment of the present invention, the keyboard further comprises a pointing device portion coupled to the chassis and the first keyboard portion for translation relative to the chassis as a function of the rotation of the first keyboard portion. A further linkage provides the necessary coupling to effect translation of the pointing device portion.

In a preferred embodiment of the present invention, the keyboard further comprises a return spring coupled to the chassis and one of the first and second keyboard portions to bias the keyboard toward the stowed position. The return spring helps the user stow the keyboard. Of course, more than one return spring may be employed; and the return spring may take any one of a number of alternative forms. The present invention does not require a return spring, however.

In a preferred embodiment of the present invention, the keyboard further comprises a position locking structure for maintaining a selected orientation of the first and second keyboard portions. Once the user has selected a desired orientation (fully deployed, fully stowed or a position therebetween) the user may then engage the position locking structure to prevent the keyboard from reorienting. The position locking structure may be frictional or positive engagement, but is not required.

In a preferred embodiment of the present invention, the chassis and the first and second keyboard portions contain a plurality of bosses and a plurality of corresponding slots. The bosses are engageable within the slots to guide the first and second keyboard portions as the keyboard moves between the deployed and stowed positions. The bosses and slots preferably restrict the degree of rotation attainable by the first and second keyboard portions and further preferably prevent the first and second keyboard portions from separating from the chassis or baseplate, as the case may be.

In a preferred embodiment of the present invention, the linkage comprises first and second extension plates coupled to the first and second keyboard portions, respectively, the first and second extension plates pivotally coupled to one another to allow relative rotation therebetween. While the extension plates are not necessary, they may be desirable in some applications.

In a preferred embodiment of the present invention, the linkage comprises a boss associated with the first keyboard portion and a corresponding slot associated with the second keyboard portion, the boss engageable within the slot to rotate the second keyboard portion as the function of the rotation of the first keyboard portion. The present invention therefore preferably employs a simple means by which to couple the first and second keyboard portions.

In a preferred embodiment of the present invention, the first and second axes are substantially parallel when the keyboard is in the stowed position. Most preferably, the keyboard of the present invention remains usable in its stowed position. When the first and second axes are substantially parallel, the keyboard presents its key conventionally, with no ergonomic advantage over conventional keyboards.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
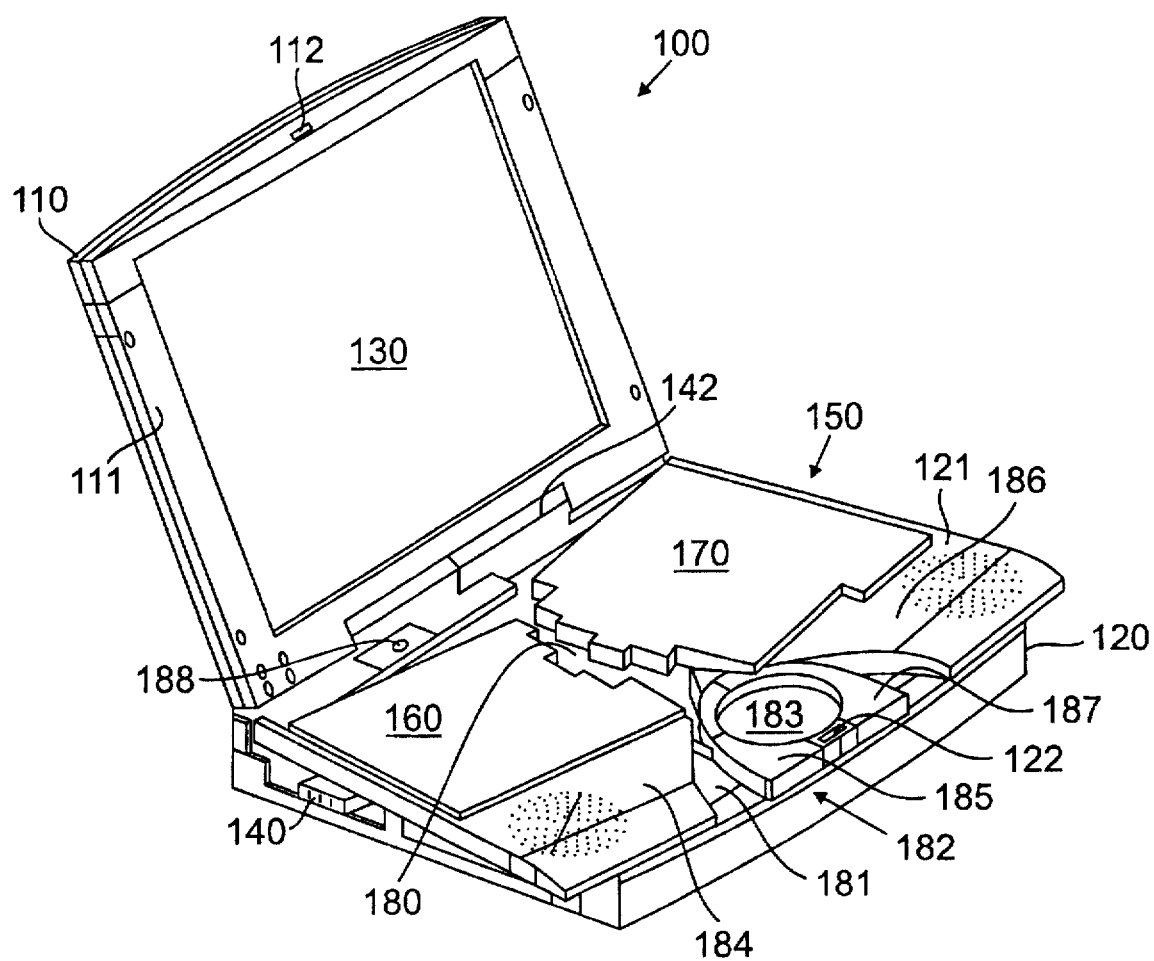
FIG. 1 illustrates an isometric view of a portable computer in an open position having a first embodiment of an ergonomic keyboard constructed according to the present invention, the keyboard having a fixed pointing device portion and shown in a deployed position.

Referring initially to FIG. 1, illustrated is an isometric view of a portable computer 100 in an open position. The computer 100 may be an IBM PC-compatible computer, an Apple Macintosh® computer or a portable computer of other logical architecture. The present invention is in no manner limited by the particular structure, function, logical architecture or compatibility of the computer 100.

Figure 2:
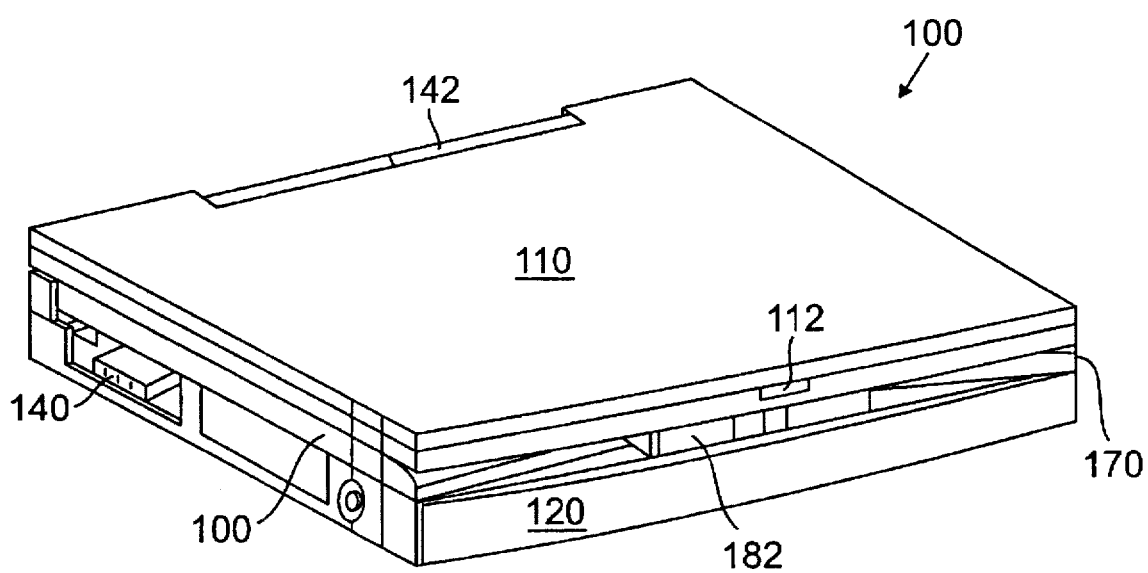
FIG. 2 illustrates an isometric view of the portable computer of FIG. 1 in a closed position and wherein the first embodiment of the keyboard is shown in a stowed position.

The computer 100 comprises a first chassis portion 110 and a second chassis portion 120 coupled to the first chassis portion 110 by a hinge structure 142. The hinge structure 142 allows the first and second chassis portions 110, 120 to rotate relative to one another between a closed position (as illustrated in FIG. 2) wherein the first and second chassis portions substantially overlay one another to enclose interior surfaces 111, 121 thereof. A conventional latch 112 and corresponding latch receiver 122 cooperate to maintain the computer 100 in the closed position until released.

The hinge structure 142 further allows the first chassis portion 110 to rotate away from the second chassis portion 120 to the open position shown. In the open position, the interior surfaces 111, 121 are exposed for access by a user. The first chassis portion 110 has a display screen 130 associated therewith. The display screen 130 is conventionally adapted to receive and display output data produced by conventional general purpose data processing and storage circuitry (schematically represented and designated 140) usually contained within the second chassis portion 120.

The computer 100 is shown as having a first embodiment of an ergonomic keyboard 150 constructed according to the present invention and shown in a deployed position. The keyboard 150 comprises a lefthand keyboard portion 160 and a righthand keyboard portion 170. For purposes of the present invention, the "first keyboard portion" alternatively refers to either the lefthand keyboard portion 160 or the righthand keyboard portion 170. Likewise, the "second keyboard portion" alternatively refers to the other of either the lefthand keyboard portion 160 or the righthand keyboard portion 170. Each of the lefthand and righthand keyboard portions 160, 170 bears a plurality of individually-depressible keys (to be referenced in subsequent FIGUREs) that are electrically coupled to the general purpose data processing and storage circuitry 140 to provide a means by which a user may generate input data for the computer 100.

The lefthand and righthand keyboard portions 160, 170 are coupled to an underlying baseplate 181 by separate pivots (to be illustrated in subsequent FIGUREs), allowing the lefthand and righthand keyboard portions to pivot or rotate relative to the second chassis portion 120. The baseplate 181 is coupled to and made a part of the second chassis portion 120. A linkage 140 couples the lefthand and righthand keyboard portions 160, 170 together, such that an n° clockwise rotation by the lefthand keyboard portion 160 results in a corresponding n° counterclockwise rotation by the righthand keyboard portion 170, within travel limits to be described. A position locking structure 188 (to be described more fully) presents a vertical ratchet, allowing the user to fix a particular desired orientation of the lefthand and righthand keyboard portions 160, 170. It should be understood that, in the alternative, separate structures within the second chassis portion 120 may support the lefthand and righthand keyboard portions 160, 170, thereby eliminating a need for the baseplate 181 to be in one piece.

As previously mentioned, one of the findings of ergonomic research is that a proper lateral orientation of keyboard keys appears to be beneficial in reducing injury due to repeated typing movement while the user's wrists are under strain. In a manner to be described, the present invention allows a user to deploy the keyboard 150 by splaying the lefthand and righthand keyboard portions 160, 170 to reorient the keys thereon into an ergonomic presentation for the benefit of the user. "Ergonomic presentation" therefore is defined, for purposes of the present invention, as being a presentation that takes into account the user's human anatomy.

The first embodiment of the keyboard 150 of the present invention illustrated in FIG. 1 has a fixed pointing device portion 182. The pointing device portion 182 bears a trackpad 183 (or a trackball or other pointing device, as appropriate) and lefthand and righthand momentary switches (or "buttons") 185, 187. It should be appreciated that, from the point of view of an input device, the pointing device portion 182 functions as a mouse, providing a means by which a user may point (the trackpad 183) and a means by which the user may click or drag (the lefthand and righthand buttons 185, 187).

Further, each of the lefthand and righthand keyboard portions 160, 170, includes palmrests 184, 186. The palmrests 184, 186 provide further ergonomic advantage by freeing the user's hands of the weight of the user's forearms. As the computer 100 may be a multimedia computer having the ability to generate stereo sound for the benefit of the user, the palmrests 184, 186 further provide an area for speakers located under speaker grilles (not separately referenced). Alternatively, the speaker grilles may be located on side surfaces of the computer 100.

Turning now to FIG. 2, illustrated is an isometric view of the portable computer 100 of FIG. 1 in a closed position and wherein the first embodiment of the keyboard 150 is shown in a stowed position. FIG. 2 is presented primarily for the purpose of illustrating that the lefthand and righthand keyboard portions 160, 170 collapse to within a footprint of the computer 100 when the keyboard 150 is in its stowed position. The pointing device portion 182 likewise falls within the footprint of the computer 100. Again, the latch 112 allows the user to release the first chassis portion 110 from the second chassis portion 120 for relative rotation therewith by means of the hinge structure 142.

Figure 3:
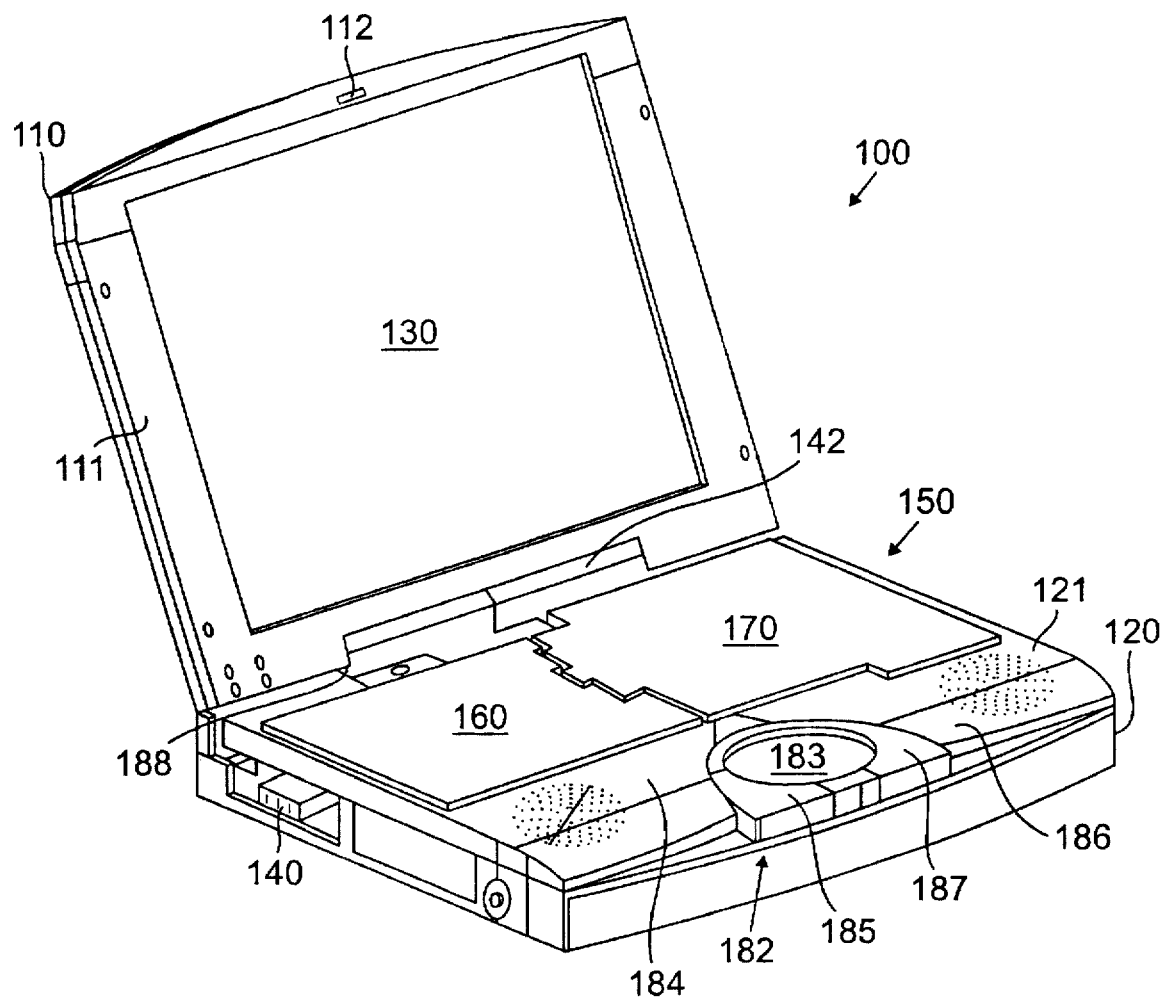
FIG. 3 illustrates an isometric view of the portable computer of FIG. 1 in the open position and wherein the first embodiment of the keyboard is shown in a stowed position.

Turning now to FIG. 3, illustrated is an isometric view of the portable computer 100 of FIG. 1 in the open position and wherein the first embodiment of the keyboard 150 is shown in a stowed position. FIG. 3 is presented primarily for the purpose of illustrating that the keyboard 150 remains fully accessible to the user and operative when the computer 100 is in the open position and the keyboard 150 is in the stowed position. Although the plurality of keys of the lefthand and righthand keyboard portions 160, 170 are not off-axis to ease typing stress, they remain functional. Further, the palmrests 184, 186 remain available for supporting the user's wrists. The pointing device portion 182 further remains accessible.

Figure 4:
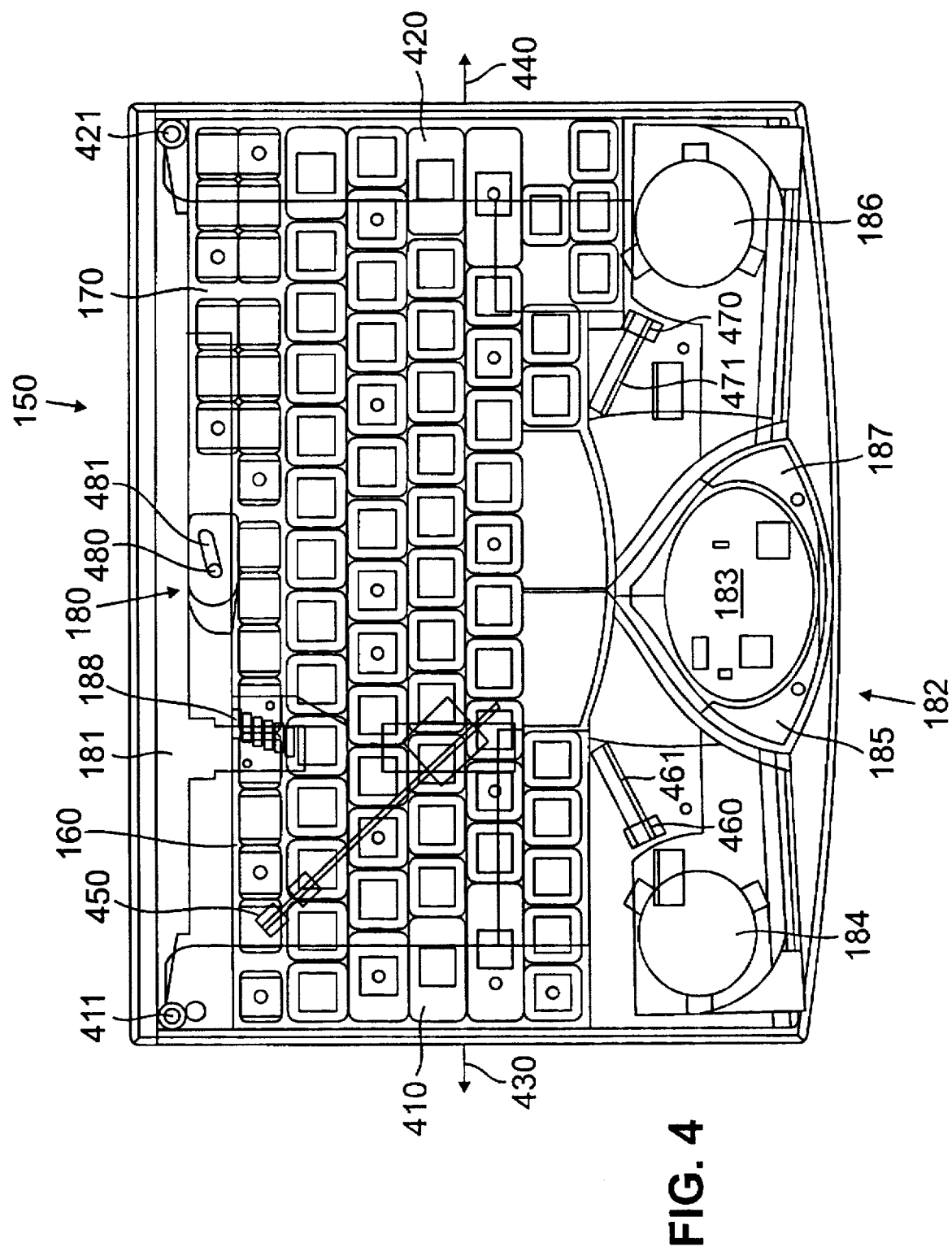
FIG. 4 illustrates a plan view of the first embodiment of the keyboard shown in the stowed position.

Turning now to FIG. 4, illustrated is a plan view of the first embodiment of the keyboard 150 shown in the stowed position. Structures that underlie and allow the keyboard 150 to assume different positions are shown in broken line.

Again, illustrated are the lefthand and righthand keyboard portions 160, 170, the linkage 180, the pointing device portion 182 (including the trackpad 183 and the lefthand and righthand buttons 185, 187), the palmrests 184, 186 (and associated speakers) and the position locking structure 188.

As previously described, the lefthand keyboard portion 160 supports a plurality of keys 410. Similarly, the righthand keyboard portion 170 supports a plurality of keys 420. The plurality of keys 410 are arranged in rows that align with a lefthand axis 430 defining the orientation of the plurality of keys 410 of the lefthand keyboard portion 160. Likewise, the plurality of keys 420 are arranged in rows that align with a righthand axis 440 defining the orientation of the plurality of keys 420 of the righthand keyboard portion 170. As can be seen, since the keyboard 150 is in its stowed position, the lefthand and righthand axes 430, 440 are substantially parallel and thus aligned with respect to one another.

FIG. 4 shows a pivot 411 coupling the lefthand keyboard portion 160 to the underlying baseplate 181 and a pivot 421 coupling the righthand keyboard portion 170 to the underlying baseplate 181. The pivots 411, 421 provide a center of rotation for the lefthand and righthand keyboard portions 160, 170; in a manner to be illustrated, the various guides that confine the rotation of the lefthand and righthand keyboard portions 160, 170 and otherwise couple the lefthand and righthand keyboard portions 160, 170 to the underlying baseplate 181 are constructed with reference to the pivots 411, 421 and therefore have radii of curvature extending to their respective pivots 411, 421.

A return spring 450 is shown coupled between the baseplate 181 and an underlying surface of the lefthand keyboard portion 160. In the first embodiment of the keyboard 150, the return spring preferably comprises a length of resilient metallic material forming a cantilever arm. Since the keyboard 150 is shown in the stowed position, the return spring 450 is shown as being relatively straight and therefore relatively stress-free, with little or no force exerted thereby on the lefthand keyboard portion 160.

A boss 460 is shown extending upward from the baseplate and engaging through a corresponding arcuate slot 461 in the underlying surface of the lefthand keyboard portion 160. The boss 460 and slot 461 cooperate to confine the rotation of the lefthand keyboard portion to a desired number of degrees (in the illustrated embodiment, about 10°). The boss 460 and slot 461 also prevent the lefthand keyboard portion from separating vertically from the baseplate 181, thereby counteracting a tendency for the lefthand keyboard portion 160 to warp when a user places pressure on the palmrest 184.

Correspondingly, a boss 470 is shown extending upward from the baseplate and engaging through a corresponding arcuate slot 471 in the underlying surface of the righthand keyboard portion 170. The boss 470 and slot 471 cooperate to confine the rotation of the righthand keyboard portion to a desired number of degrees (about 10°, preferably to correspond with the confinement of the lefthand keyboard portion 160). The boss 470 and slot 471 also prevent the righthand keyboard portion 170 from separating vertically from the baseplate 181, thereby counteracting a tendency for the righthand keyboard portion 170 to warp when a user places pressure on the palmrest 186.

In practice, it has been found that the slots 461, 471 and other slots employed in the various embodiments of the keyboard 150 of the present invention may present frictional resistance to the movement of any bosses therethrough. Accordingly, it may be advantageous to line the slot(s) with plastic or other low-friction material to reduce the resistance and thereby smooth the operation of the keyboard 150.

The linkage 180, as described previously, couples the lefthand and righthand keyboard portions 160, 170 to ensure that they rotate in tandem. In the first embodiment illustrated in FIG. 4, the linkage 180 comprises a boss 480 fixed to the righthand keyboard portion 170 and confined within an arcuate slot 482 formed within a member (not separately referenced) fixed to the lefthand keyboard portion 160. As the lefthand and righthand keyboard portions 160, 170 rotate between the stowed and deployed positions, the boss 480 traverses the slot 482. The slot 482 defines the movement of the boss 480 and therefore the rotation of the righthand keyboard portion 170 fixed thereto.

The position locking structure 180 comprises a plurality of detents (shown but not separately referenced) formed on the underlying surface of the lefthand keyboard portion 160 and a corresponding follower (also not referenced) formed on the underlying baseplate 181. As the lefthand keyboard portion 160 rotates between the stowed and deployed positions, the follower traverses the detents. The force required to remove the follower from a particular detent preferably exceeds the spring force exerted by the return spring 450. Therefore, the position locking structure 180 allows the user to lock the keyboard 150 at a given position (either the stowed or fully deployed positions or any one of a number of given intermediate positions).

Figure 5:
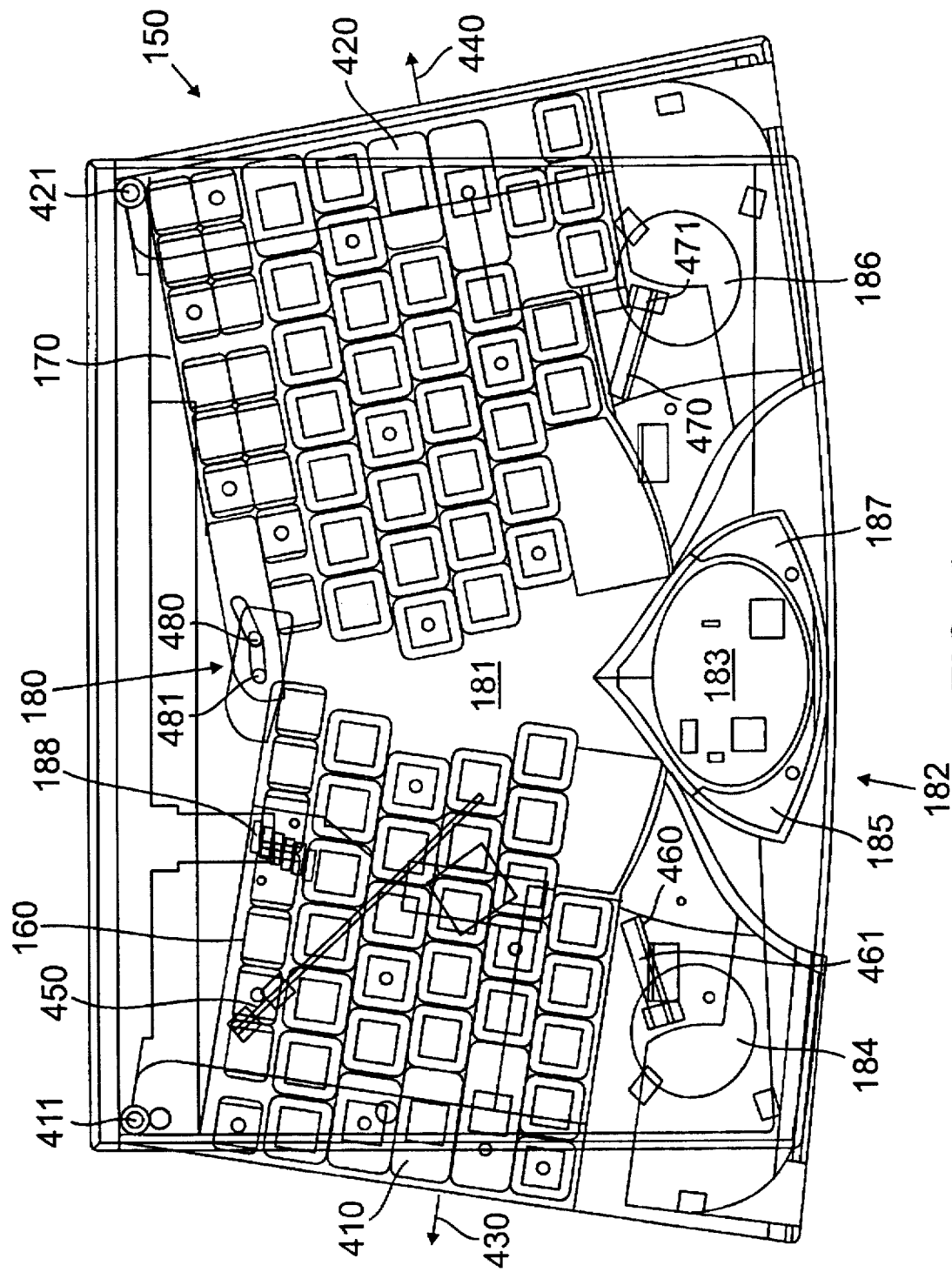
FIG. 5 illustrates a plan view of the keyboard of FIG. 4 shown in the deployed position.

Turning now to FIG. 5, illustrated is a plan view of the keyboard 150 of FIG. 4 shown in the deployed position. FIG. 5 shows how the bosses 460, 470, 480 traverse their corresponding arcuate slots 461, 471, 481. Further, FIG. 5 shows how the lefthand and righthand axes 430, 440 are misaligned to effect an ergonomic presentation of the pluralities of keys 410, 420 to the user. Assuming that the travel of the lefthand and righthand keyboard portions 160, 170 is limited to 10° clockwise and counterclockwise, respectively, the total misalignment of the lefthand and righthand axes 430, 440 is therefore 20°. Of course, other degrees of misalignment are within the broad scope of the present invention.

Finally, FIG. 5 more clearly delineates the division of the keyboard keys between the lefthand and righthand keyboard portions 160, 170. On a conventional QWERTY keyboard and, more specifically, on a 101-key IBM PC AT standard keyboard, the dividing line is illustrated as being as follows: between the "F7" and "F8" on the top row, between the "6" and "7" keys on the second-from-the-top row, between "T" and "Y" on the third-from-the-top row, between "G" and "H" on the fourth-from-the-top row and between "B" and "N" on the fifth-from-the-top row. As can readily be seen, the spacebar is divided into left and right portions. This represents a conventional division of keys and is evident on more conventional ergonomic keyboards for desktop computers. Of course, other divisions of the keyboard keys are within the broad scope of the present invention.

Figure 6:
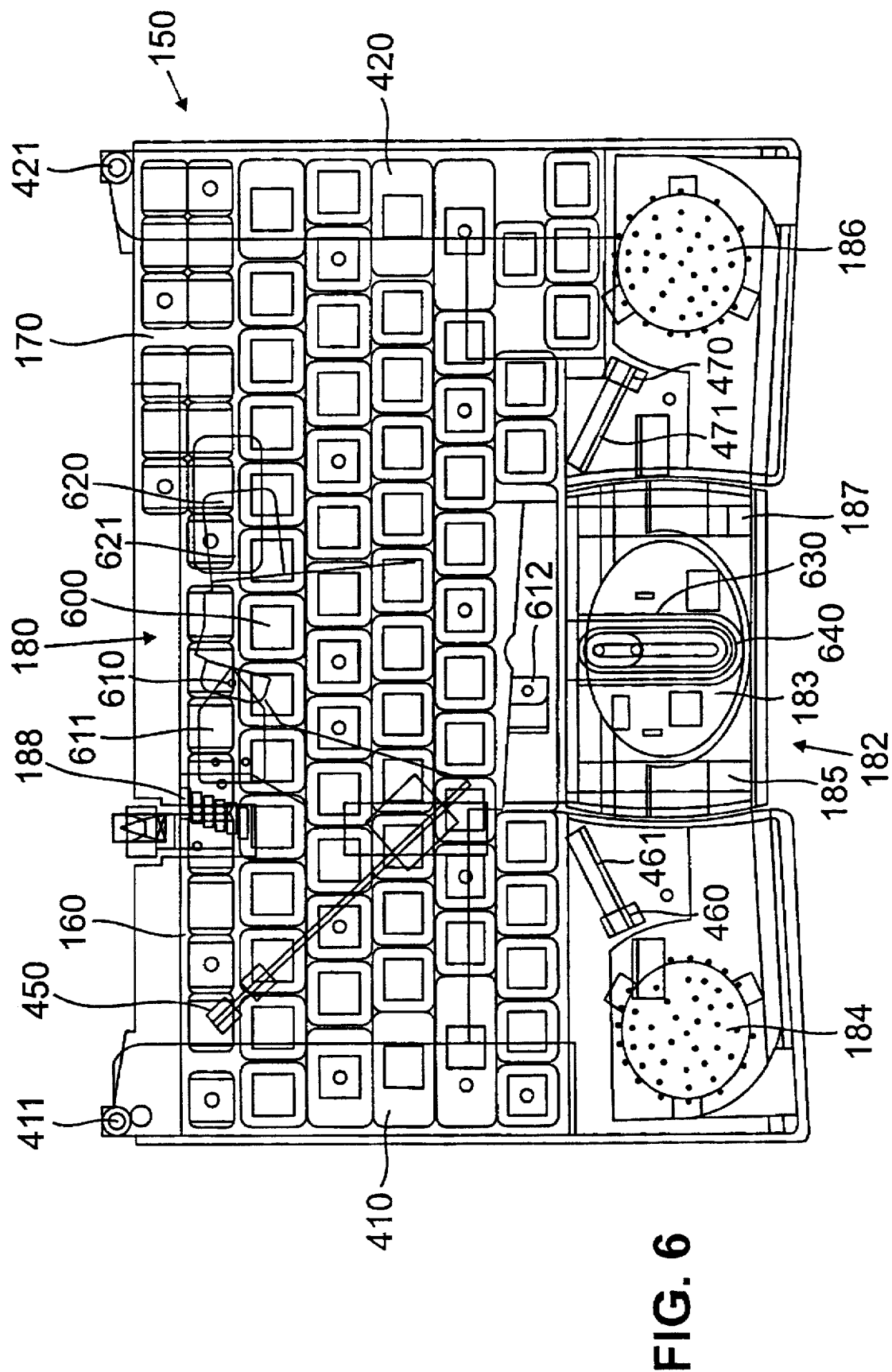
FIG. 6 illustrates a plan view of a second embodiment of the keyboard having a slidable pointing device portion and shown in the stowed position.

Turning now to FIG. 6, illustrated is a plan view of a second embodiment of the keyboard 150 having a slidable pointing device portion 182 and shown in the stowed position. The second embodiment primarily differs from the first by its introduction of a sliding pointing device portion 182. In other respects, the second embodiment of the keyboard 150 is similar to the first. Accordingly, similar components will not be described again.

An elongated boss 630 protruding from an underlying surface of the pointing device portion 182 slidably couples the pointing device portion 182 to a straight slot 640 in the underlying baseplate 181. The boss 630 is elongated to prevent substantial rotation of the pointing device portion 182 with respect to the baseplate 181. An elongated plate structure 600 extends upward, as shown, from the pointing device portion 182 to the linkage 180, where the elongated plate structure 600 is coupled to an extension plate 611 extending from the lefthand keyboard portion 160 by a hingepin 610 for rotation relative thereto. The elongated plate structure 600 is further coupled to the righthand keyboard portion 170 by a boss 620 residing within an arcuate slot 621 formed in an extension plate (not referenced) fixed to the righthand keyboard portion 170. It is apparent that, as the lefthand keyboard portion 160 is rotated clockwise, the extension plate 611 moves, forcing the elongated plate structure 600 downward, as shown (the elongated plate structure 600 includes a hinge 612 to accommodate any lateral movement caused by rotation of the extension plate 611). This causes the pointing device portion 182 to extend toward the user and away from the remainder of the keyboard 150. As the elongated plate 600 moves downward, the boss 620 traverses the slot 621, forcing the righthand keyboard portion 170 into a counterclockwise rotation. This combined action moves the keyboard 150 toward the deployed position.

Figure 7:
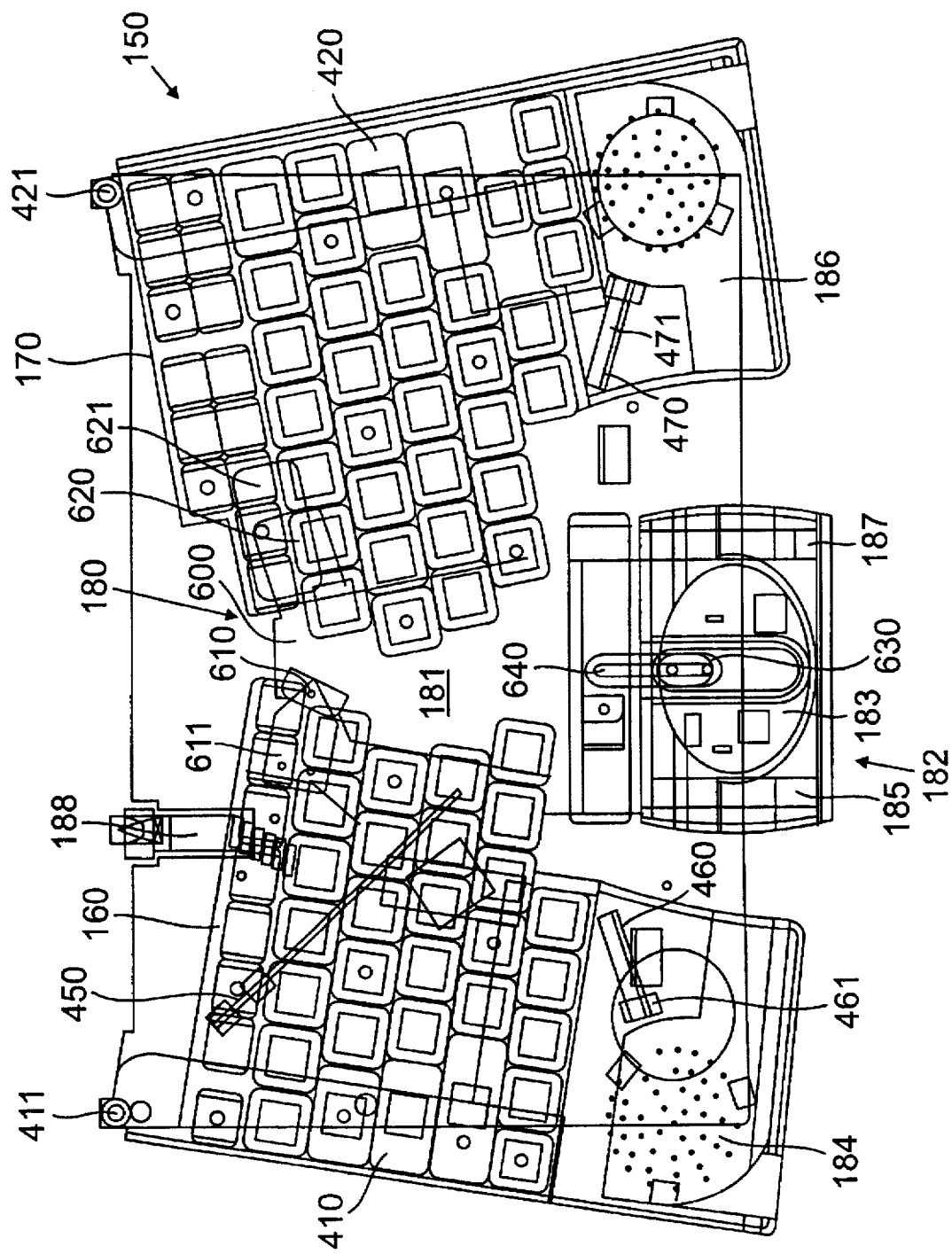
FIG. 7 illustrates a plan view of the keyboard of FIG. 6 shown in the deployed position.

Turning now to FIG. 7, illustrated is a plan view of the keyboard 150 of FIG. 6 shown in the deployed position. As can be seen, the elongated boss 630 has fully traversed the straight slot 640, fully extending the pointing device portion 182 for use.

Figure 8:
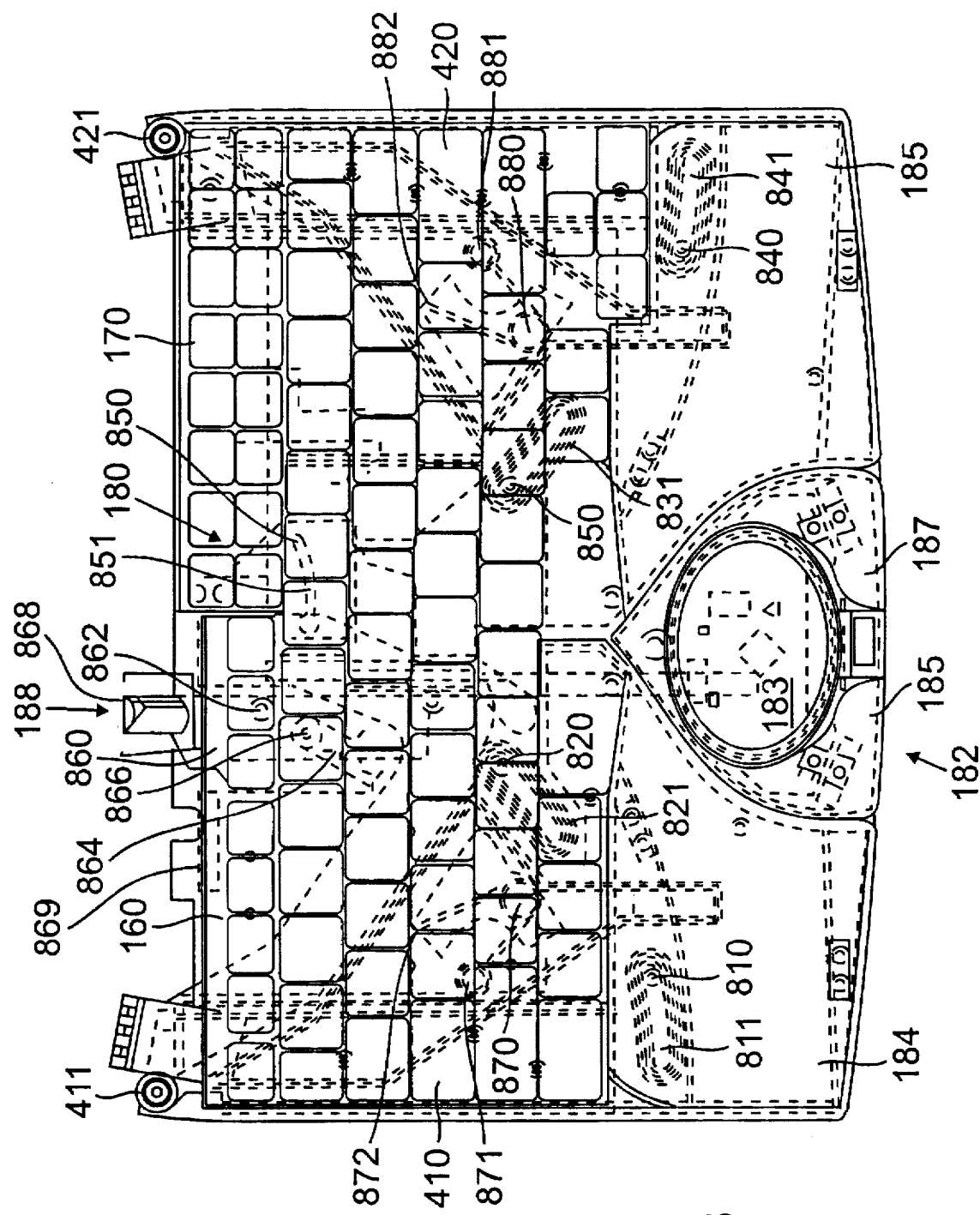
FIG. 8 illustrates a plan view of a third embodiment of the keyboard having a fixed pointing device portion and a modified return spring structure and shown in the stowed position.

Turning now to FIG. 8, illustrated is a plan view of a third embodiment of the keyboard 150 having a fixed pointing device portion 182 and a modified return spring structure and shown in the stowed position. In the previously-described embodiments, the spring force of the return spring 450 and the locking force of the position locking structure 188 are preferably balanced to allow the keyboard 150 to be moved between the stowed and deployed positions without requiring substantial effort on the user's behalf to deploy the keyboard 150 or slamming the keyboard 150 shut.

FIG. 8 shows an alternative third embodiment that, in some applications, provides a smoother movement for the keyboard 150. As with the second embodiment, only those components that differ from those already described will be described in detail. First, FIG. 8 shows a plurality of bosses 810, 820 extending from the underlying surface of the lefthand keyboard portion 160 and residing within corresponding arcuate slots 811, 821 in the underlying baseplate 181. The bosses 810, 820 and slots 811, 821 cooperate as before to limit the rotation of the lefthand keyboard portion 160 and to prevent the lefthand keyboard portion 160 from separating from the underlying baseplate 181 (or warping under pressure applied to the palmrest 184). Similarly, FIG. 8 shows a plurality of bosses 830, 840 extending from the underlying surface of the righthand keyboard portion 170 and residing within corresponding arcuate slots 831, 841 in the underlying baseplate 181. Again, the bosses 830, 840 and slots 831, 841 cooperate to limit the rotation of the righthand keyboard portion 170 and to prevent the righthand keyboard portion 170 from separating from the underlying baseplate 181 (or warping under pressure applied to the palmrest 186).

Lefthand and righthand torsion return springs 870, 880 replace the cantilever arm torsion return spring 450 of the previous embodiments. First ends 871, 881 of the lefthand and righthand torsion return springs 870, 880 are coupled to the underlying baseplate 181. Second ends 872, 882 of the lefthand and righthand torsion return springs 870, 880 are coupled to the underlying surfaces of the lefthand and righthand keyboard portions 160, 170, respectively. As the lefthand and righthand keyboard portions 160, 170 are rotated toward the deployed position, the first ends 871, 881 and second ends 872, 882 of the lefthand and righthand torsion return springs 870, 880 move toward one another, compressing the lefthand and righthand torsion return springs 870, 880 and providing a resistance against further deployment. It is apparent in FIG. 8 that the lefthand and righthand torsion return springs 870, 880 are not fixed at their respective centers. Therefore, the lefthand and righthand torsion return springs 870, 880 exert a variable spring force as the lefthand and righthand keyboard portions are rotated. This variable spring force may be balanced to allow deploying and stowing forces to be roughly equal. A boss 850 and arcuate slot 851 form the linkage, coupling the lefthand and righthand keyboard portions 160, 170 together for coordinated rotation.

The position locking structure 188 differs from that previously illustrated in that it comprises a locking plate 860 attached to the underlying baseplate 181 by a pivot 862. The locking plate 860 has a serrated edge 864 containing a plurality of detents over which a pin 866 travels. The pin 866 is attached to the lefthand keyboard portion 160. A spring 869 biases the locking plate toward counterclockwise rotation, maintaining the serrated edge 864 against the pin 866. A button portion 868 of the locking plate 860 allows a user to overcome the spring force presented by the spring 869. By moving the button portion 868 to the right, as shown, the user may disengage the serrated edge 864 from the pin 866. The keyboard 150 is thereby freed for stowage or deployment, as desired. The button portion 868 may be accessible to a user for direct actuation thereby and, additionally, may be positioned for automatic actuation (such as by the first chassis portion 110 of FIG. 1, allowing the keyboard 150 to be stowed automatically as the computer 100 of FIG. 1 is rotated toward its closed position).

The position locking structure 188 provides a horizontal ratchet. A horizontal ratchet is, in many applications, superior to a vertical ratchet, in that the lefthand and righthand keyboard portions 160, 170 are not forced out of their plane of rotation as they are rotated. By keeping the lefthand and righthand keyboard portions 160, 170 in their plane of rotation, the overall stability of the keyboard 150 is improved.

Furthermore, the position locking structure 188 is designed to present a ratchet force that increases as the keyboard 150 is deployed. The lefthand and righthand torsion return springs 870, 880 present a return force that decreases as the keyboard 150 is deployed. When combined, the ratchet and return forces most preferably yield a relatively constant force.

Figure 9:
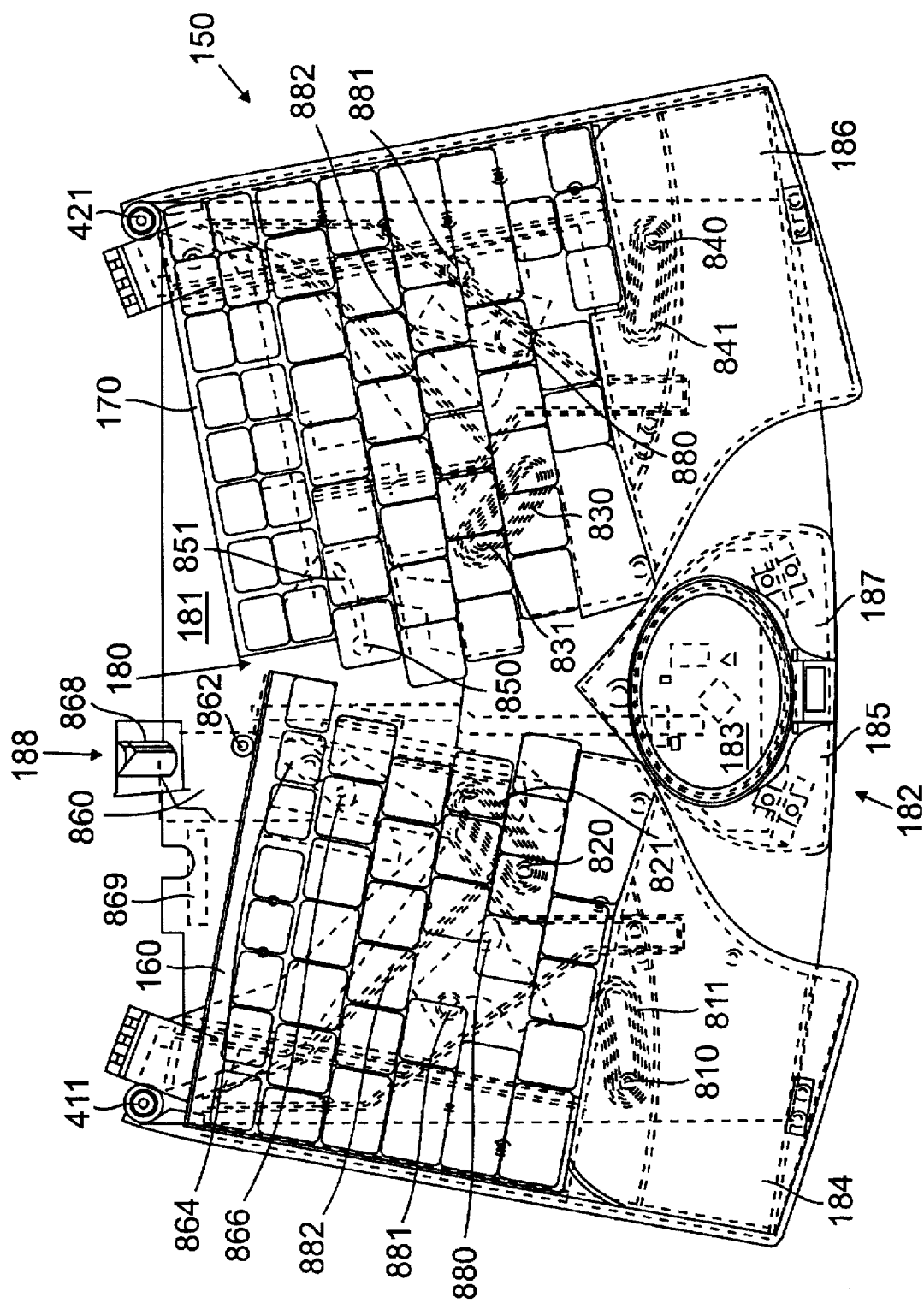
FIG. 9 illustrates a plan view of the keyboard of FIG. 8 shown in the deployed position.

Turning now to FIG. 9, illustrated is a plan view of the keyboard 150 of FIG. 8 shown in the deployed position. FIG. 9 is presented primarily for the purpose of showing the change in relative position of the bosses 810, 820, 830, 840, 850 with respect to their corresponding arcuate slots 811, 821, 831, 841, 851 as the keyboard 150 assumes its deployed position.

Figure 10:
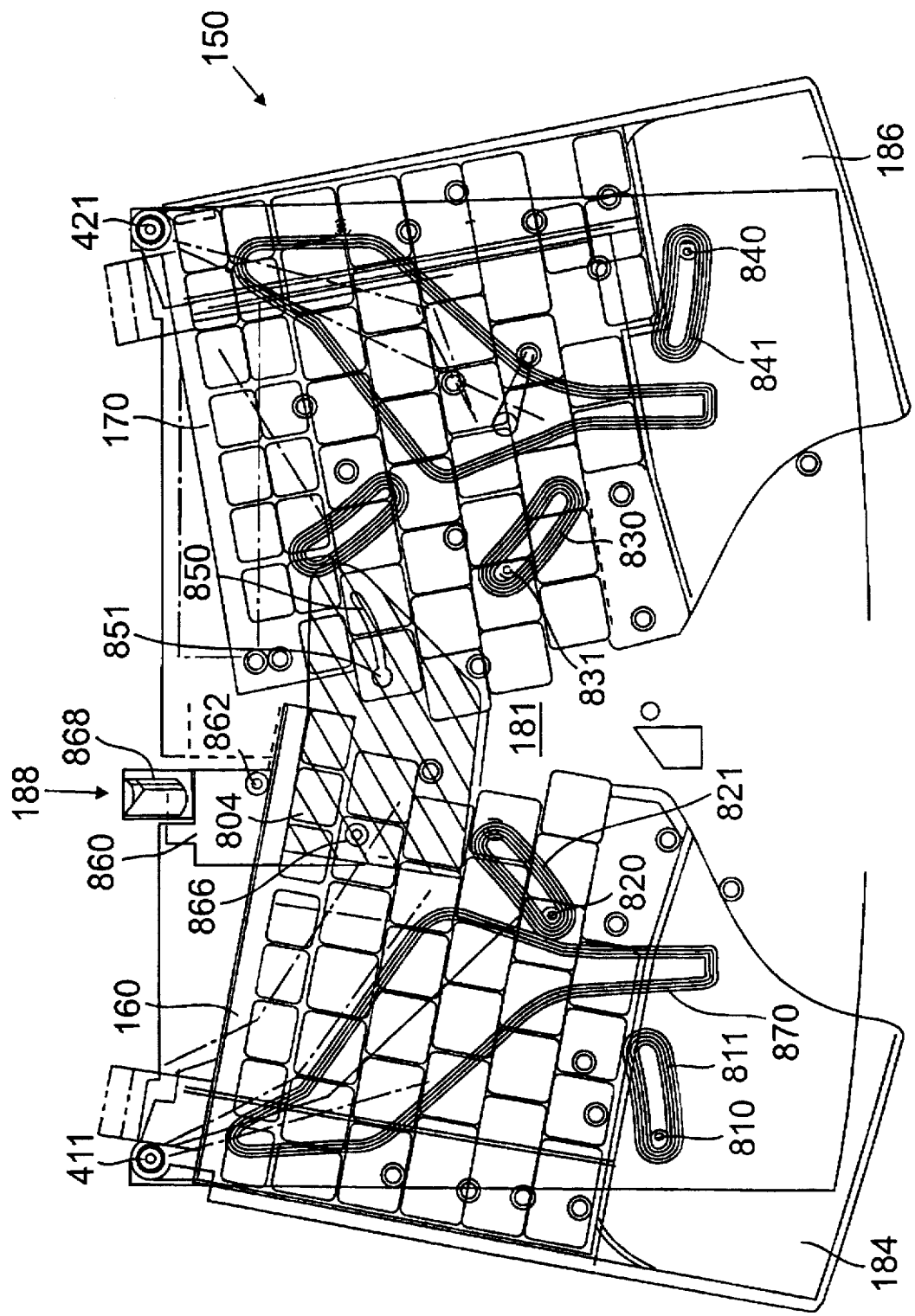
FIG. 10 illustrates a plan view of a fourth embodiment of the keyboard having a fixed pointing device portion and a modified linkage and shown in the deployed position.

Turning now to FIG. 10, illustrated is a plan view of a fourth embodiment of the keyboard 150 having a modified linkage 180 and shown in the deployed position. The pointing device portion, although it is fixed, is not illustrated in FIG. 10 to simplify depiction of the keyboard 150.

The modified linkage 180 eliminates a separate extension plate from the lefthand keyboard portion 160 and is achieved by providing an additional boss 910 protruding from the underlying surface of the righthand keyboard portion 170 for engagement with a corresponding arcuate slot 911 in the baseplate 181. Note again that all arcuate slots 811, 821, 831, 841, 911 have radii of curvature extending to their respective pivots 411, 421.

From the above description, it is apparent that the present invention provides an ergonomic keyboard for a portable computer having a chassis and methods of operation and manufacture therefor. The keyboard includes: (1) a first keyboard portion pivotally coupled to a first location on the chassis for rotation relative thereto, the first keyboard portion supporting a first plurality of keys aligned along a first axis, (2) a second keyboard portion pivotally coupled to a second location on the chassis for rotation relative thereto, the second keyboard portion supporting a second plurality of keys aligned along a second axis and (3) a linkage coupling the first and second keyboard portions for rotating the second keyboard portion as a function of a rotation of the first keyboard portion, the keyboard thereby movable between a deployed position wherein the first and second axes are misaligned to effect an ergonomic presentation of the first and second pluralities of keys to a user and a stowed position wherein the first and second keyboard portions are within a footprint of the chassis.

Figure 11:
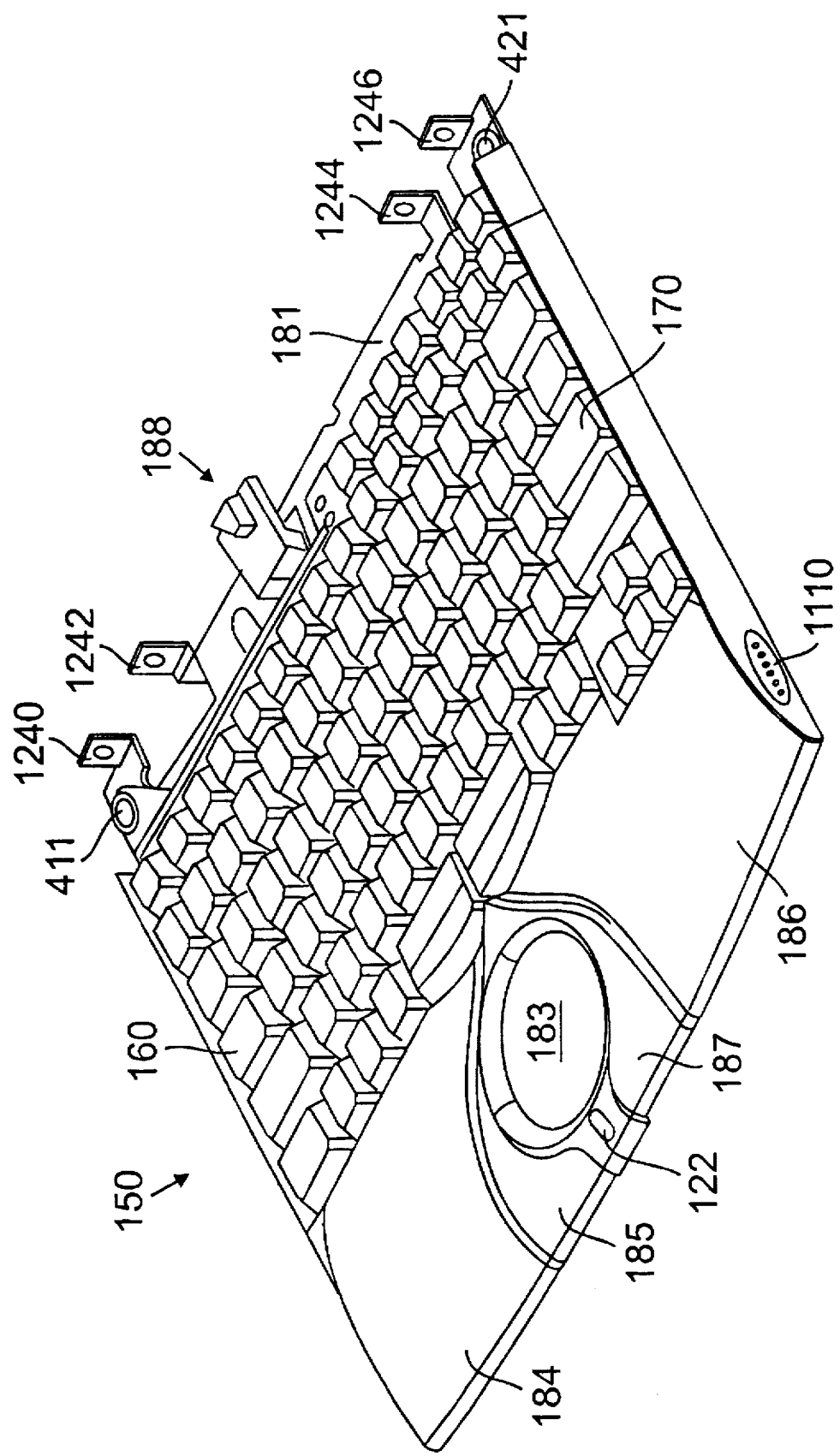
FIG. 11 illustrates an isometric view of a fifth embodiment of the keyboard having a modified underlying baseplate with improved thermal and structural characteristics and shown in the stowed position.

Turning now to FIG. 11, illustrated is an isometric view of a fifth embodiment of the keyboard 150 having a modified underlying baseplate 181 with improved thermal and structural characteristics and shown in the stowed position.

In addition to the features and structures previously described in detail, FIG. 11 shows a side speaker port 1110. The side speaker port 1110 can be employed to cooperate with a speaker (not shown in FIG. 11, but preferably mounted under the palmrest 186) to emit higher frequency sounds produced by the speaker. By providing the side speaker port at the extreme right side edge of the keyboard 150, the higher frequency sounds emitted therefrom are perceived to be originating at the side of the keyboard 150. Similarly, a side speaker port (not shown) is advantageously provided on the extreme left side edge of the keyboard 150 to emit similar higher frequency sounds produced by another speaker (not shown) preferably mounted under the palmrest 184. The two side speaker ports can cooperate to provide superior stereo separation for the benefit of the user located in front of the keyboard 150.

Figure 12:
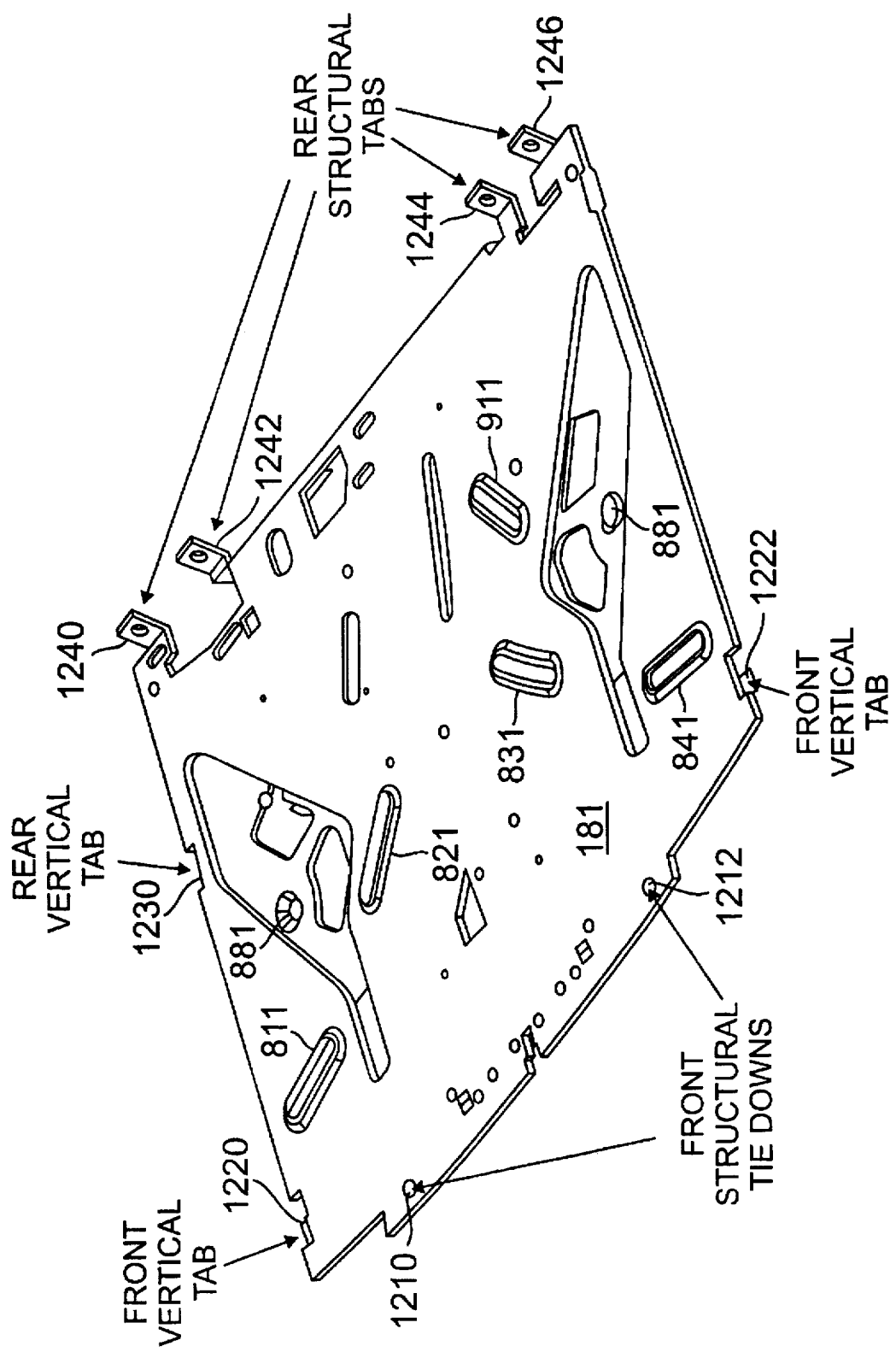
FIG. 12 illustrates an isometric view of the underlying baseplate of FIG. 11 with the overlying keyboard portions removed.

Turning now to FIG. 12, illustrated is an isometric view of the underlying baseplate 181 of FIG. 11 with the overlying first and second keyboard portions 160, 170 removed for clarity.

The baseplate 181 is illustrated as comprising left and right front structural tie downs 1210, 1212; left and right front vertical tabs 1220, 1222; a left rear vertical tab 1230 (a corresponding right rear vertical tab does not exist due to mounting constraints with respect to an underlying base) and rear structural tabs 1240, 1242, 1244, 1246. The rear structural tabs 1240, 1242, 1244, 1246 are arranged in left and right inboard and outboard pairs. As will be described more particularly in conjunction with FIG. 13, the left outboard and inboard rear structural tab pair 1240, 1242 cooperates with a left rear bulkhead and the right outboard and inboard rear structural tab pair 1244, 1246 cooperates with a right rear bulkhead. Also in a manner to be described more particularly with respect to FIG. 13, the baseplate 181 and the left and right rear bulkheads preferably cooperate to take advantage of the planar strength of the baseplate 181.

Figure 13:
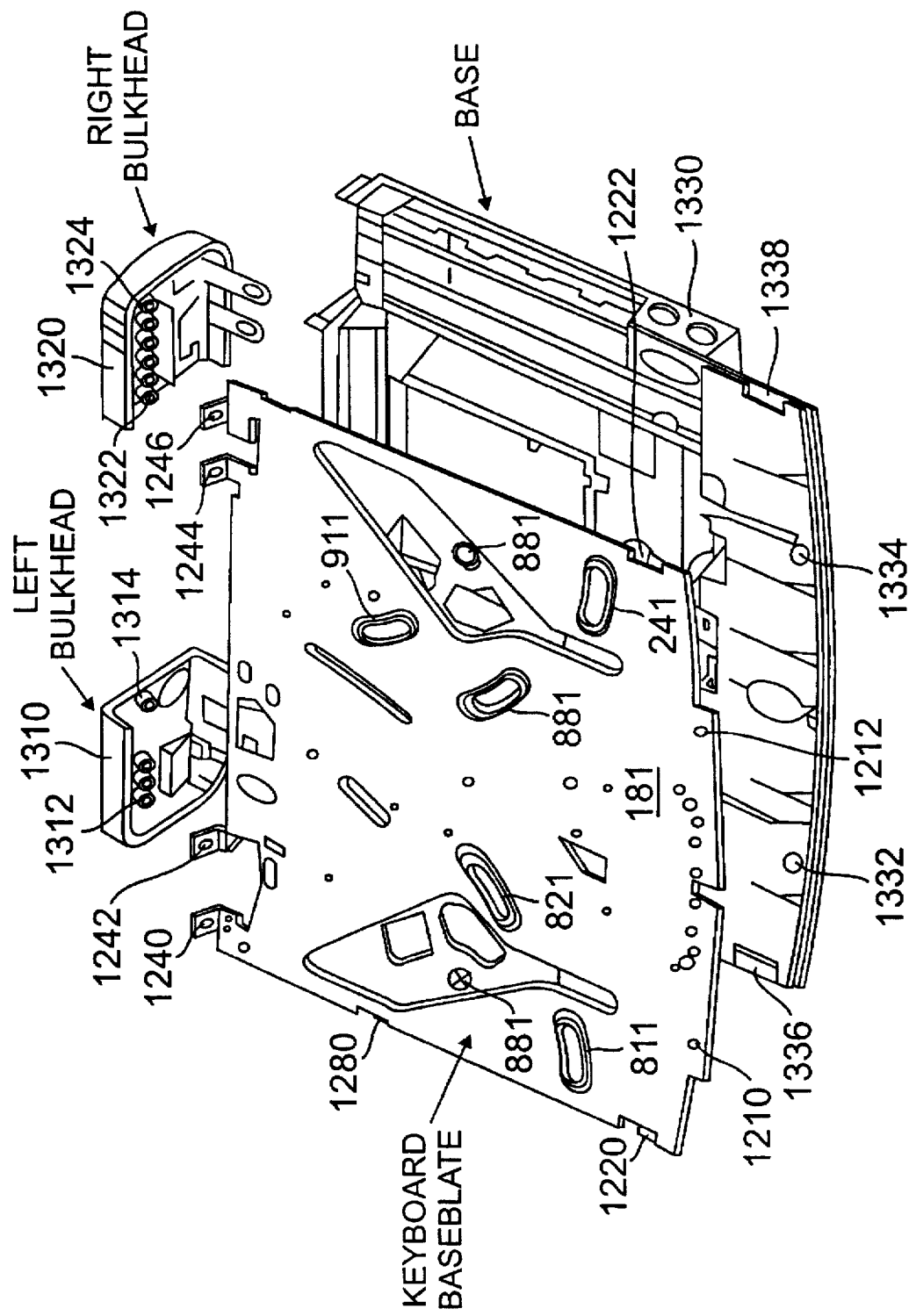
FIG. 13 illustrates an exploded isometric view of the baseplate of FIGS. 11 and 12 as it is to be mated with a base that forms a part of the second chassis portion and bulkheads that cooperate to join the first and second chassis portions.

Turning now to FIG. 13, illustrated is an exploded isometric view of the baseplate 181 of FIGS. 11 and 12 as it is to be mated with a base 1330 that forms a part of the second chassis portion 120 and bulkheads 1310, 1320 that cooperate to join the first and second chassis portions 110, 120.

Since the plane of the baseplate 181 illustrated in FIG. 12 is not interrupted to receive a recessed keyboard therethrough (as is the case in almost all prior art portable computers), the baseplate 181 can be a significant structural member of the second chassis portion 120.

More specifically, the left and right front structural tie downs 1210, 1212 are aligned to be mated with corresponding left and right front screw bosses 1332, 1334. Screws (not shown) may then be driven through the left and right front structural tie downs 1210, 1212 and into the left and right front screw bosses 1332, 1334 to bind the baseplate 181 and the base 1330 together. Most preferably, the left and right front structural tie downs 1210, 1212 have a sloped inner surface and are of sufficient diameter to allow the screws (not shown) to be countersunk into the baseplate 181, such that the screws are flush with the upper surface (not separately referenced) of the baseplate 181. This ensures an interference fit between the left and right front structural tie downs 1210, 1212 and the screws, requiring the screws to counteract a bending moment when the baseplate 181 and the base 1330 are shifted laterally with respect to one another (against which moment the screws are stiff). Countersinking the screws therefore renders the second chassis portion 120 more rigid.

The left and right front vertical tabs 1220, 1222 are aligned to be mated with corresponding left and right front slots 1336, 1338. The left and right front vertical tabs 1220, 1222 are inserted into the left and right front slots 1336, 1338 by translating the baseplate 181 relative to the base 1330. Likewise, the left rear vertical tab 1230 is aligned to be mated with a corresponding left rear slot (not shown). The left rear vertical tab 1230 is inserted into the left rear slot by translating the baseplate 181 relative to the base 1330. As with the left and right front structural tie downs 1210, 1212, the left and right front vertical tabs 1220, 1222 and the rear vertical tab 1230 have a sloped inner surface and are of sufficient diameter to allow the screws (not shown) to be countersunk into the baseplate 181, such that the screws are flush with the upper surface (not separately referenced) of the baseplate 181. Again, this ensures an interference fit between the left and right front vertical tabs 1220, 1222 and the rear vertical tab 1230 and the screws, requiring the screws to counteract a bending moment when the baseplate 181 and the base 1330 are shifted laterally with respect to one another (against which moment the screws are stiff). Countersinking these screws therefore renders the second chassis portion 120 even more rigid.

The left and right front structural tie downs 1210, 1212, left and right front screw bosses 1332, 1334, left and right front vertical tabs 1220, 1222, left and right front slots 1336, 1338, left rear vertical tab 1230 and left rear slot (not shown) gusset the corners of the second chassis portion 120, cooperating to provide several spatially-separated points of conjunction between the baseplate 181 and the base 1330 and resisting racking of the second chassis portion 120.

Joining the baseplate 181 to the base 1330 is straightforward. The baseplate 181 is lowered onto the base 1330 so as to align the above-detailed tabs 1220, 1222, 1230 and slots 1332, 1334 (and the unreferenced left rear slot). The baseplate 181 is then translated rearwardly, as shown, relative to the base 1330, causing the tabs to be inserted into the slots. Finally, the screws (not shown) are countersunk into the left and right front structural tie downs 1210, 1212 and into the left and right front screw bosses 1332, 1334 to prevent further relative translation and bind the baseplate 181 and the base 1330 together.

A left rear bulkhead 1310 has left and right screw bosses 1312, 1314 associated therewith. The left and right screw bosses 1312, 1314 are aligned to be mated with the left outboard and inboard rear structural tab pair 1240, 1242. Screws (not shown) may be driven through the left outboard and inboard rear structural tab pair 1240, 1242 and into the corresponding left and right screw bosses 1312, 1314 to bind the baseplate 181 and the left rear bulkhead 1310 together. Unlike the tie downs 1210, 1212 and vertical tabs 1220, 1222, 1230 described above, the screws associated with the left rear bulkhead 1310 are preferably not countersunk into the left outboard and inboard rear structural tab pair 1240, 1242. Forces directed at the baseplate 181 from the left rear bulkhead 1310 (primarily caused by opening or closing the portable computer 100) are mostly in the plane of the baseplate 181, resulting in the screws mating the left rear bulkhead 1310 to the left outboard and inboard rear structural tab pair 1240, 1242 being placed in tension. A screw in tension presents stiff resistance to such forces, significantly stiffening the second chassis portion 120 as against such forces. Because it is desired to counteract such forces as effectively as possible, the left outboard and inboard rear structural tab pair 1240, 1242 are preferably made as short as possible, to place the screws as close to the plane of the baseplate 181 as possible.

In a similar fashion, a right rear bulkhead 1320 has left and right screw bosses 1322, 1324 associated therewith. The left and right screw bosses 1322, 1324 are aligned to be mated with the right outboard and inboard rear structural tab pair 1244, 1246. Screws (not shown) may be driven through the right outboard and inboard rear structural tab pair 1244, 1246 and into the corresponding left and right screw bosses 1322, 1324 to bind the baseplate 181 and the right rear bulkhead 1320 together. Again, the left and right bulkheads 1310, 1320 cooperate to join the first and second chassis portions 110, 120. As above, unlike the tie downs 1210, 1212 and vertical tabs 1220, 1222, 1230 described above, the screws associated with the right rear bulkhead 1320 are preferably not countersunk into the right outboard and inboard rear structural tab pair 1244, 1246. Forces directed at the baseplate 181 from the right rear bulkhead 1320 are mostly in the plane of the baseplate 181, resulting in the screws mating the right rear bulkhead 1320 to the right outboard and inboard rear structural tab pair 1244, 1246 being placed in tension. This again significantly stiffens the second chassis portion 120 as against such forces. As above, because it is desired to counteract such forces as effectively as possible, the right outboard and inboard rear structural tab pair 1244, 1246 are preferably made as short as possible, to place the screws as close to the plane of the baseplate 181 as possible.

The baseplate 181 is advantageously located to provide a thermal path, and thereby a heat sink, for heat generated by the general purpose data processing and storage circuitry 140, and most advantageously a CPU, of the portable computer 100. The baseplate 181 may directly contact one or more components of the general purpose data processing and storage circuitry 140 or may receive heat therefrom via an indirect path of air or a thermally-transmissive substance, such as commercially-available Chotherm®. Those skilled in the art are familiar with the need to remove heat from sensitive general purpose data processing and storage circuitry 140 and the heat-sinking capacity that a large, preferably metallic, structure such as the baseplate 181 would afford.

Much is set forth above concerning the ability of the present invention to provide a "conventional keyboard," because the ergonomic keyboard transforms itself between a fully functional ergonomic keyboard in the deployed position into a fully functional nonergonomic keyboard in the stowed position. In fact, one of the advantages of the present invention is that, in the stowed position, the keyboard continues to present its keys conventionally to a user. The keyboard therefore remains fully usable and functional in its stowed position by retaining the rows of keys in the lefthand and righthand keyboard portions in conventional alignment, both rotationally and translationally, with respect to one another in the stowed position.

The term "conventional keyboards" is defined as nonergonomic keyboards that are familiar to users in today's world. The term "conventional keyboards" includes QWERTY keyboards, Dvorak keyboards and other standard types of keyboards, such as those found on the IBM Selectric® typewriter, the 101-key IBM PC AT standard keyboard, or those commercially available from Dell Computer Corporation of Austin, Tex., such as part numbers 26756 and SK1000RS.

The term "conventional keyboards" expressly does not include the offset-axis keyboard that results when the keyboard with translating sections provided on the IBM Thinkpad® (and described in published European Patent Application serial no. 95101911.6, filed on Feb. 13, 1995) is placed in its stowed position. Although the Thinkpad's keyboard with translating sections remains functional in an electrical sense (electrical signals are produced when keys are depressed) when stowed, any user desiring to type on the stowed keyboard at any useful speed would certainly be required to undergo extensive retraining, because its rows of keys are offset, both vertically and horizontally. Therefore, the Thinkpad® keyboard cannot be thought of as being a functional "conventional keyboard" when stowed.

From the above description, it is apparent that the present invention provides a portable computer and method of operation thereof. The portable computer includes: (1) a first chassis portion hingedly coupled to a second chassis portion by first and second bulkheads to allow relative rotation between a closed position and an open position, (2) a display screen associated with the first chassis portion, (3) data processing and storage circuitry contained within the second chassis portion and coupled to the display screen via a cable located proximate a hinge structure coupling the first and second chassis portions and (4) a keyboard coupled to the second chassis portion and the data processing and storage circuitry and including: (4a) a first keyboard portion pivotally coupled to a first location on the second chassis portion for rotation relative thereto, the first keyboard portion supporting a first plurality of keys aligned along a first axis, (4b) a second keyboard portion pivotally coupled to a second location on the chassis for rotation relative thereto, the second keyboard portion supporting a second plurality of keys aligned along a second axis, and (4c) a baseplate having a plurality of peripheral tabs aligning with corresponding slots formed in the second chassis portion, the first and second keyboard portions coupled to the baseplate.

Although the present invention and its advantages have been described in detail, those skilled in the art should understand that they can make various changes, substitutions and alterations herein without departing from the spirit and scope of the invention in its broadest form.

What is claimed is:

1. A portable computer, comprising:
   a first chassis portion hingedly coupled to a second chassis portion by first and second bulkheads to allow relative rotation between a closed position wherein said first and second chassis portions substantially overlay one another to enclose interior surfaces thereof and an open position wherein said first chassis portion is rotated away from said second chassis portion to expose said interior surfaces thereof;
   a display screen associated with said first chassis portion;
   data processing and storage circuitry contained within said second chassis portion and coupled to said display screen via a cable located proximate a hinge structure coupling said first and second chassis portions; and
   a keyboard coupled to said second chassis portion and said data processing and storage circuitry and including:
      a first keyboard portion pivotally coupled to a first location on said second chassis portion for rotation relative thereto, said first keyboard portion supporting a first plurality of keys aligned along a first axis,
      a second keyboard portion pivotally coupled to a second location on said chassis for rotation relative thereto, said second keyboard portion supporting a second plurality of keys aligned along a second axis, and
      a baseplate having a plurality of peripheral tabs aligning with corresponding slots formed in said second chassis portion, said first and second keyboard portions coupled to said baseplate, said baseplate forming a support for said first and second keyboard portions, said tabs and said slots allowing said baseplate and said second chassis portion to form a rigid structure.

2. The portable computer as recited in claim 1 further comprising a pointing device portion coupled to said chassis.

3. The portable computer as recited in claim 1 further comprising a position locking structure for maintaining a selected orientation of said first and second keyboard portions.

4. The portable computer as recited in claim 1 wherein said chassis and said first and second keyboard portions contain a plurality of bosses and a plurality of corresponding slots, said bosses engageable within said slots to guide said first and second keyboard portions as said keyboard moves between said deployed and stowed positions.

5. The portable computer as recited in claim 1 wherein said first and second axes are substantially parallel when said keyboard is in said stowed position.

6. The portable computer as recited in claim 1 wherein components of said data processing and storage circuitry are located proximate said baseplate, said baseplate acting as a heat sink for said components.

7. The portable computer as recited in claim 1 further comprising a trackpad coupled to said chassis.

8. The portable computer as recited in claim 1 further comprising a palmrest coupled to said chassis.

9. The portable computer as recited in claim 1 further comprising an elliptical trackpad coupled to said chassis.

10. The portable computer as recited in claim 1 wherein said chassis and said first and second keyboard portions contain a plurality of bosses and a plurality of corresponding slots, said bosses engageable within said slots to prevent said first and second keyboard portions from warping.

11. A method of operating a portable computer, comprising the steps of:
   rotating a first chassis portion hingedly coupled to a second chassis portion by first and second bulkheads between a closed position wherein said first and second chassis portions substantially overlay one another to enclose interior surfaces thereof and an open position wherein said first chassis portion is rotated away from said second chassis portion to expose said interior surfaces thereof;
   providing power to a display screen associated with said first chassis portion;
   providing power to data processing and storage circuitry contained within said second chassis portion and coupled to said display screen via a cable located proximate a hinge structure coupling said first and second chassis portions; and
   deploying a keyboard coupled to said second chassis portion and said data processing and storage circuitry, said keyboard including:
      a first keyboard portion pivotally coupled to a first location on said second chassis portion for rotation relative thereto, said first keyboard portion supporting a first plurality of keys aligned along a first axis,
      a second keyboard portion pivotally coupled to a second location on said chassis for rotation relative thereto, said second keyboard portion supporting a second plurality of keys aligned along a second axis, and
      a baseplate having a plurality of peripheral tabs aligning with corresponding slots formed in said second chassis portion, said first and second keyboard portions coupled to said baseplate, said baseplate forming a support for said first and second keyboard portions, said tabs and said slots allowing said baseplate and said second chassis portion to form a rigid structure.

12. The method as recited in claim 11 further comprising the step of operating a pointing device portion coupled to said chassis.

13. The method as recited in claim 11 further comprising the step of maintaining a selected orientation of said first and second keyboard portions with a position locking structure.

14. The method as recited in claim 11 wherein said chassis and said first and second keyboard portions contain a plurality of bosses and a plurality of corresponding slots, said bosses engageable within said slots to guide said first and second keyboard portions as said keyboard moves between said deployed and stowed positions.

15. The method as recited in claim 11 wherein said first and second axes are substantially parallel when said keyboard is in said stowed position.

16. The method as recited in claim 11 further comprising the step of conducting heat away from components of said data processing and storage circuitry with said baseplate.

17. The method as recited in claim 11 further comprising the step of applying pressure to a trackpad coupled to said chassis.

18. The method as recited in claim 11 further comprising the step of applying pressure to a palmrest coupled to said chassis.

19. The method as recited in claim 11 further comprising the step of applying pressure to an elliptical trackpad coupled to said chassis.

20. The method as recited in claim 11 wherein said chassis and said first and second keyboard portions contain a plurality of bosses and a plurality of corresponding slots, said bosses engageable within said slots to prevent said first and second keyboard portions from warping.

* * * * *